US012446931B2

(12) United States Patent
Placie et al.

(10) Patent No.: US 12,446,931 B2
(45) Date of Patent: Oct. 21, 2025

(54) EXTRAMEDULLARY DEVICE AND SYSTEM

(71) Applicant: Nuvasive Specialized Orthopedics, Inc., San Diego, CA (US)

(72) Inventors: Shawn Placie, Aliso Viejo, CA (US); Jorge Lopez Camacho, Oxnard, CA (US); Ricky Quach, Aliso Viejo, CA (US); Brandon Chimits, Aliso Viejo, CA (US); Woong Kim, Fresno, CA (US)

(73) Assignee: Nuvasive Specialized Orthopedics Inc., San Diego, PA (US)

( * ) Notice: Subject to any disclaimer, the term of this patent is extended or adjusted under 35 U.S.C. 154(b) by 377 days.

(21) Appl. No.: 18/004,813

(22) PCT Filed: Jul. 14, 2021

(86) PCT No.: PCT/US2021/041701
§ 371 (c)(1),
(2) Date: Jan. 9, 2023

(87) PCT Pub. No.: WO2022/015898
PCT Pub. Date: Jan. 20, 2022

(65) Prior Publication Data
US 2023/0248403 A1    Aug. 10, 2023

Related U.S. Application Data

(60) Provisional application No. 63/053,036, filed on Jul. 17, 2020.

(51) Int. Cl.
*A61B 17/80* (2006.01)
*A61B 17/00* (2006.01)

(52) U.S. Cl.
CPC ...... *A61B 17/8004* (2013.01); *A61B 17/8023* (2013.01); *A61B 2017/00212* (2013.01);
(Continued)

(58) Field of Classification Search
CPC ..................... A61B 17/8004; A61B 17/8023
See application file for complete search history.

(56) References Cited

U.S. PATENT DOCUMENTS

| 7,207,993 B1 | 4/2007 | Baldwin et al. |
| 8,764,809 B2 | 7/2014 | Lorenz et al. |

(Continued)

FOREIGN PATENT DOCUMENTS

| FR | 3010300 A1 | 3/2015 |
| WO | 2020/069627 A1 | 4/2020 |

OTHER PUBLICATIONS

International Search Report and Written Opinion, International Application No. PCT/US2021/041701, dated Dec. 13, 2021, 18 pages.

*Primary Examiner* — Olivia C Chang

(57) ABSTRACT

One aspect of the disclosure relates to an extramedullary distraction and compression system. The extramedullary distraction system includes: a housing configured to be attached to a bone at a first location, the housing having a magnet and a lead screw positioned therein, wherein the lead screw is coupled to the magnet such that rotation of the magnet causes rotation of the lead screw, at least one retainer clip disposed around the lead screw; a rod configured to be attached to the bone at a second location and configured to interact with the lead screw such that, upon rotation of the lead screw, the rod distracts or contracts relative to the housing.

14 Claims, 12 Drawing Sheets

(52) U.S. Cl.
CPC .............. *A61B 2017/00398* (2013.01); *A61B 2017/00876* (2013.01)

(56) References Cited

U.S. PATENT DOCUMENTS

| | | |
|---|---|---|
| 9,179,938 B2 | 11/2015 | Pool et al. |
| 2014/0155946 A1 | 6/2014 | Skinlo et al. |
| 2014/0243906 A1 | 8/2014 | Cavalazzi et al. |
| 2015/0272644 A1 | 10/2015 | Noon et al. |
| 2019/0015138 A1* | 1/2019 | Schwardt ........... A61B 17/7216 |

\* cited by examiner

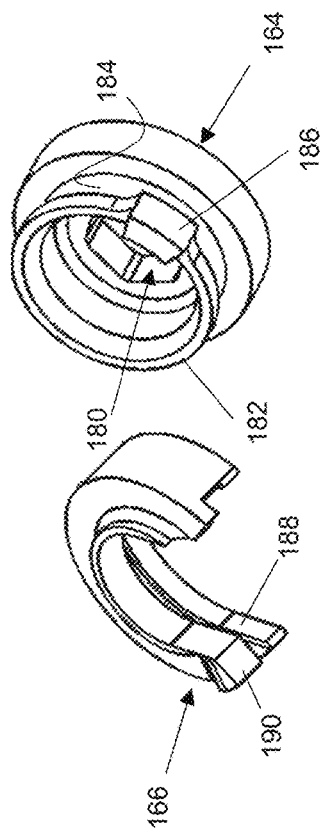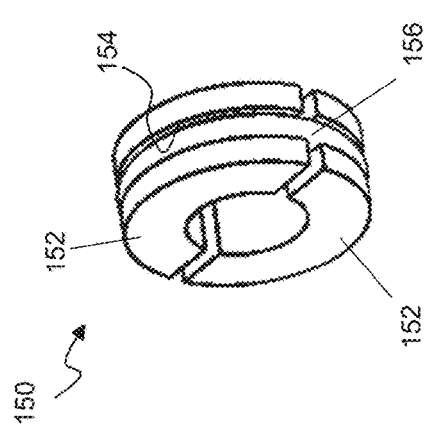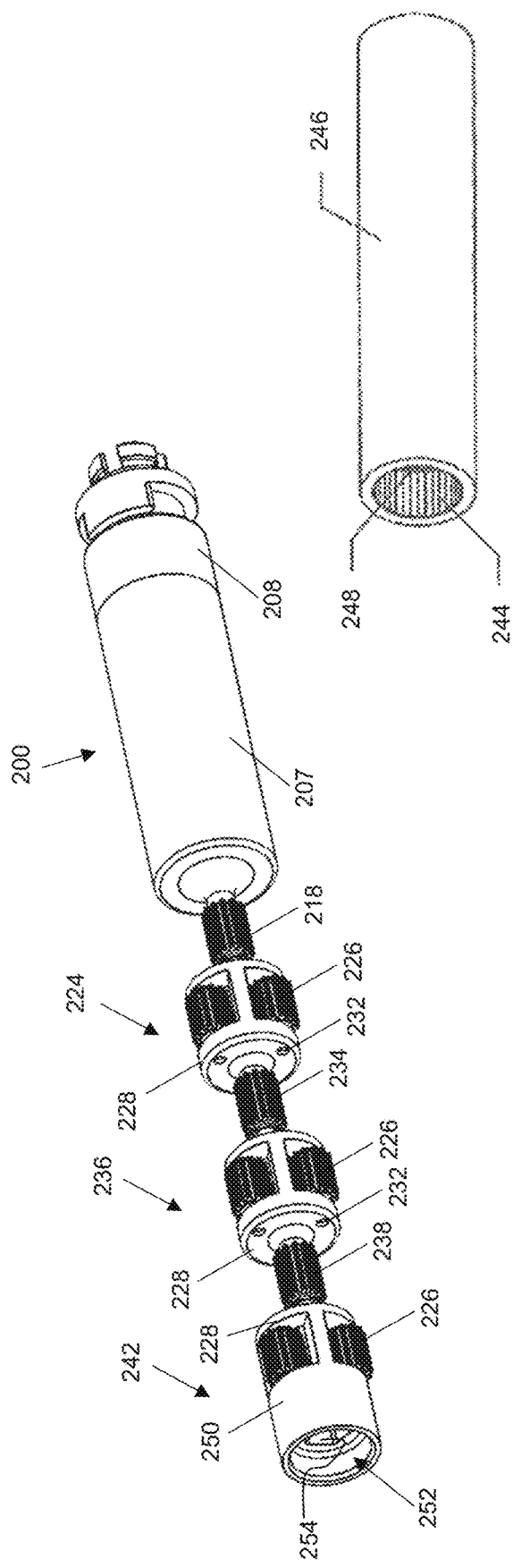

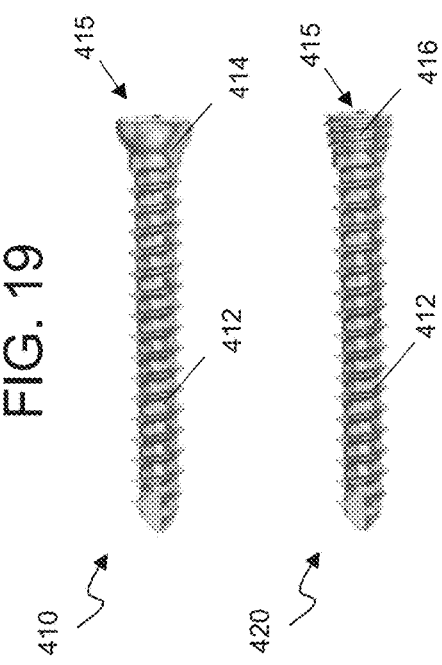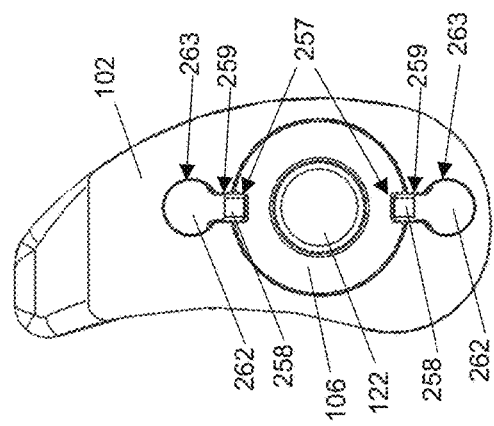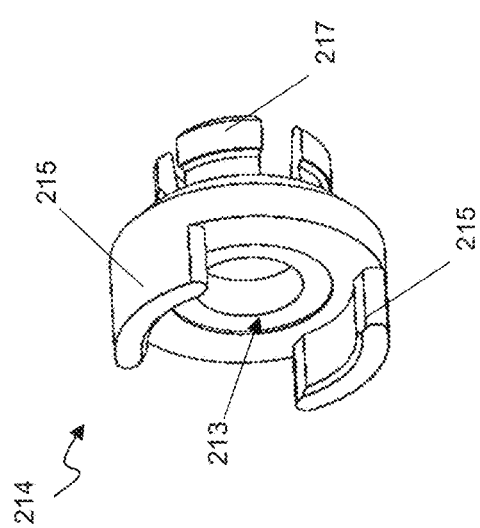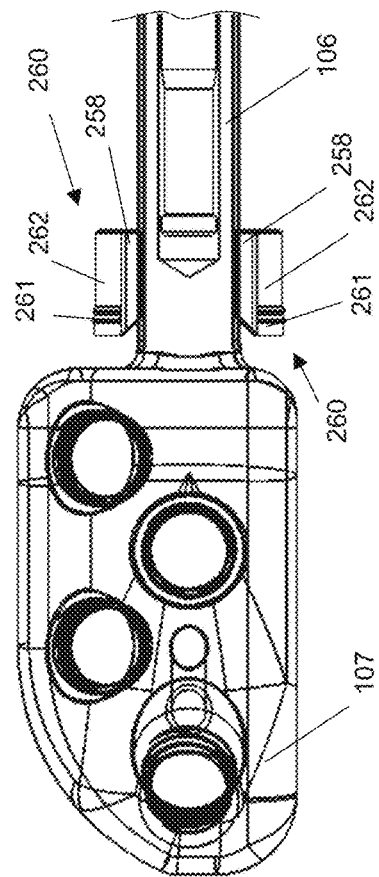

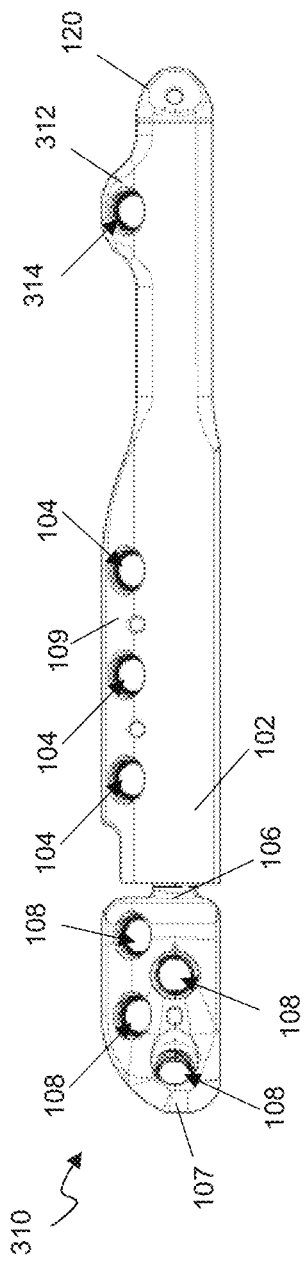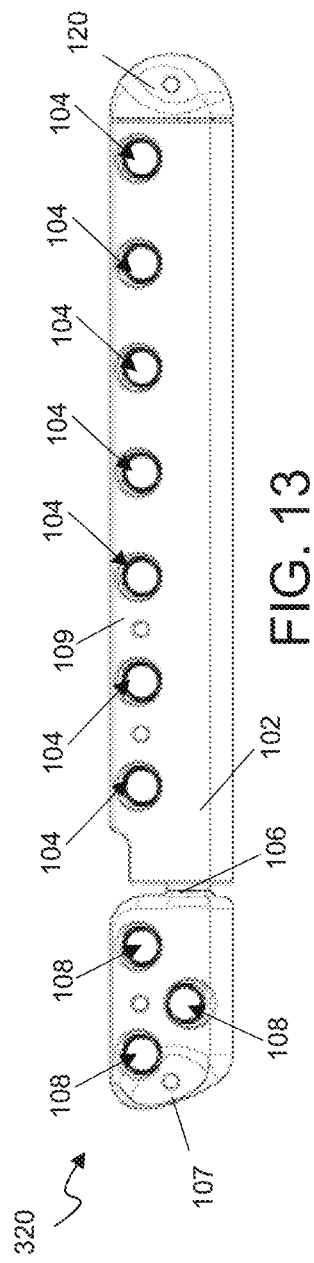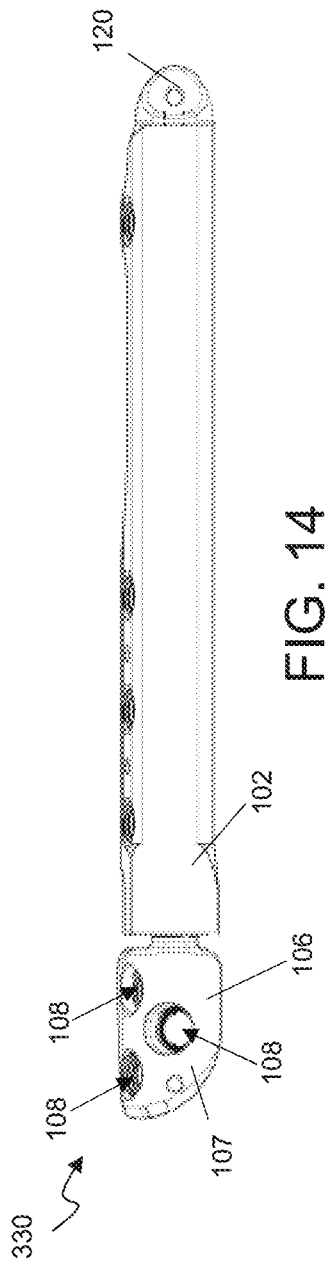

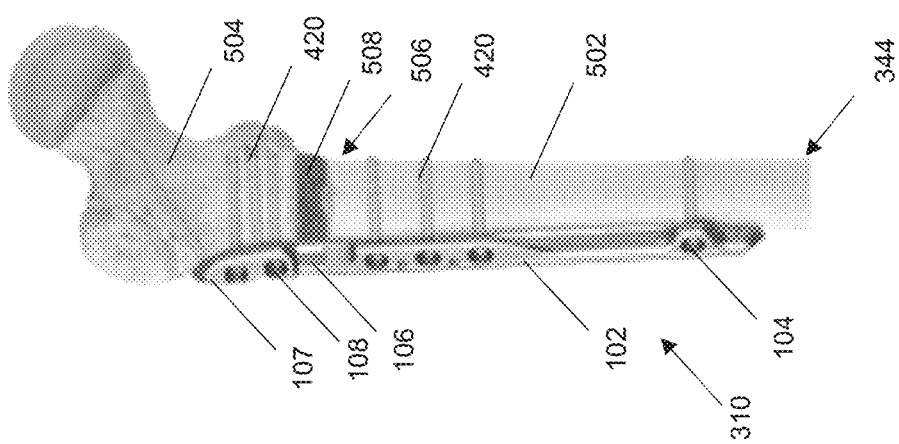

EXTRAMEDULLARY DEVICE AND SYSTEM

CROSS REFERENCE TO RELATED APPLICATIONS

The present application is a US national phase entry under 35 USC § 371 of International Patent Application No. PCT/US2021/041701, filed Jul. 14, 2021, which claims priority to U.S. Provisional Application No. 63/053,036, filed Jul. 17, 2020.

TECHNICAL FIELD

The subject matter described herein relates to an extramedullary distraction and compression device, system and associated methods.

BACKGROUND

Distraction osteogenesis is a technique which has been used to grow new bone in patients with a variety of defects. For example, limb lengthening is a technique in which the length of a bone (for example a femur or tibia) may be increased. By creating a corticotomy, or osteotomy, in the bone, which is a cut through the bone, the two resulting sections of bone may be moved apart at a particular rate, such as one (1.0) mm per day, allowing new bone to regenerate between the two sections as they move apart. This technique of limb lengthening is used in cases where one limb is longer than the other, such as in a patient whose prior bone break did not heal correctly, or in a patient whose growth plate was diseased or damaged prior to maturity. In some patients, stature lengthening is desired, and is achieved by lengthening both femurs and/or both tibia to increase the patient's height.

Limb lengthening is often performed using external fixation, wherein an external distraction frame is attached to the two sections of bone by pins which pass through the skin. The pins can be sites for infection and are often painful for the patient, as the pin placement site remains a somewhat open wound "pin tract" throughout the treatment process. The external fixation frames are also bulky, making it difficult for patient to comfortably sit, sleep and move. Intramedullary lengthening devices also exist, such as those described in U.S. Patent Application Publication No. 2011/0060336, which is incorporated by reference herein.

SUMMARY

A first aspect of the disclosure relates to an extramedullary distraction and compression system. The extramedullary distraction system includes: a housing configured to be attached to a bone at a first location, the housing having a magnet and a lead screw positioned therein, wherein the lead screw is coupled to the magnet such that rotation of the magnet causes rotation of the lead screw, at least one retainer clip disposed around the lead screw; a rod configured to be attached to the bone at a second location and configured to interact with the lead screw such that, upon rotation of the lead screw, the rod distracts or contracts relative to the housing.

A second aspect of the disclosure relates to an extramedullary distraction and compression system. The extramedullary distraction system includes: a housing configured to be attached to a bone at a first location; a rod configured to be attached to a bone at a second location, the rod configured to distract or contract relative to the housing, wherein at least one of the housing and the rod include at least one locking screw hole; and at least one locking screw configured to be provided within the at least one locking screw hole.

A third aspect of the disclosure relates to a method for lengthening a limb. The method includes: providing a extramedullary distraction device having a housing including a first screw hole and a rod including a second screw hole, the rod configured to distract or contract relative to the housing; attaching the housing to a bone within the limb at a first location by inserting a first locking screw within the first screw hole; attaching the rod to the bone at a second location by inserting a second locking screw within the second screw hole; actuating the distraction device to cause the rod to distract relative to the housing, wherein, during the actuating, an angular orientation of the first locking screw relative to the housing is maintained and an angular orientation of the second locking screw relative to the rod is maintained.

BRIEF DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 5 show an enlarged perspective view of a retainer clip according to embodiments of the disclosure;

FIG. 6 show an enlarged exploded view of an anti-jam retainer and ring according to embodiments of the disclosure;

FIG. 7 shows an exploded view of a gear assembly and magnet assembly according to embodiments of the disclosure;

FIG. 8 shows an enlarged perspective view of a ring gear according to embodiments of the disclosure;

FIG. 9 shows an enlarged perspective view of a maintenance member according to embodiments of the disclosure;

FIG. 10 shows an enlarged top-down view of an anti-rotation feature about the rod with the housing removed according to embodiments of the disclosure;

FIG. 11 shows a cross-sectional view taken along line B-B of FIG. 1 showing the anti-rotation feature;

FIG. 12 shows a top-down view of an extramedullary distraction and compression device according to another embodiment of the disclosure;

FIG. 13 shows a top-down view of an extramedullary distraction and compression device according to another embodiment of the disclosure;

FIG. 14 shows a side view of an extramedullary distraction and compression device according to another embodiment of the disclosure;

FIG. 19 shows a side view of a bi-cortical non-locking screw according to embodiments of the disclosure;

FIG. 20 shows a side view of a bi-cortical locking screw according to embodiments of the disclosure;

FIG. 24 shows an extramedullary distraction and compression device affixed to a bone within a limb according to embodiments of the disclosure;

Figure 1:
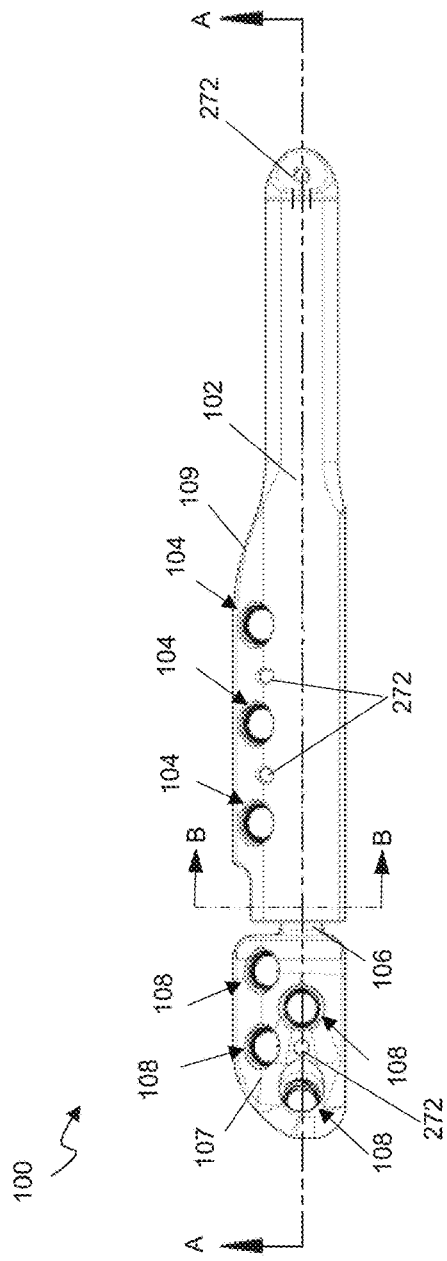
FIG. 1 shows a top-down view of a extramedullary distraction and compression device according to embodiments of the disclosure.

It is noted that the drawings of the subject matter are not necessarily to scale. The drawings are intended to depict only typical aspects of the subject matter, and therefore, should not be considered as limiting the scope of the disclosed subject matter. In the drawings, like numbering represents like elements between the drawings.

DETAILED DESCRIPTION

The present disclosure describes various embodiments of an extramedullary limb lengthening device, system and associated methods. The devices, systems and methods described herein can be used for open and closed fracture fixation, pseudoarthrosis, mal-unions and non-unions of long bones. The present disclosure is designed to avoid disruption to the growth plates and endosteal blood supply. Because the system is extramedullary, the system also provides a solution for patients with inadequate canal space to accommodate an intramedullary lengthening device.

Figure 2:
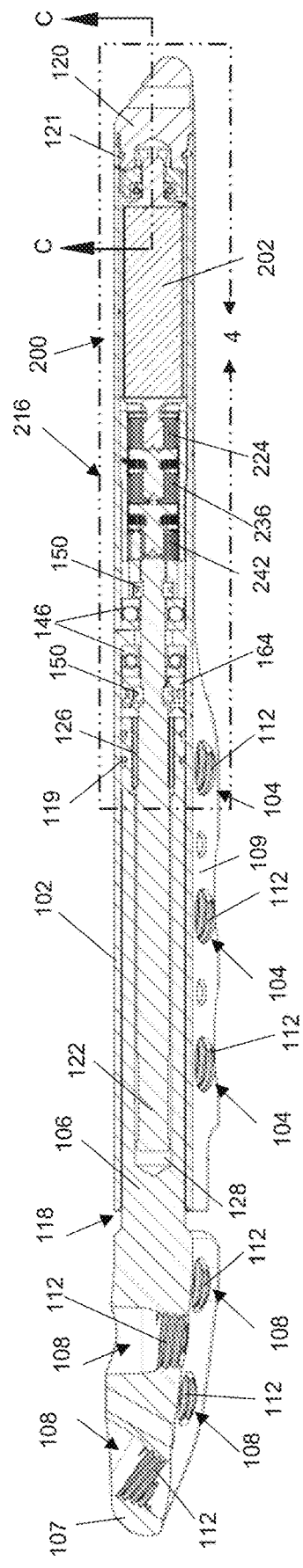
FIG. 2 shows a cross-sectional side view of the extramedullary distraction and compression device taken along line A-A of FIG. 1.

FIG. 1 shows a top-down view of an extramedullary distraction and compression device 100 according to embodiments of the disclosure and FIG. 2 shows a cross-sectional view of the device 100 taken along line A-A. As shown, the device 100 includes a housing 102 having at least one fixation aperture 104 and a distraction and compression rod 106 having at least one fixation aperture 108. Specifically, the rod 106 can terminate at a plate 107 having fixation apertures 108 therein. The plate 107 can be curved or angled in a number of different configurations dependent upon where on the bone and which bone the device 100 is to be affixed to such that the plate 107 may be contoured to a shape of the bone. Further, fixation apertures 104 may be positioned about a plate or bulge portion 109 of the housing 102. As best seen in FIG. 2, at least one fixation aperture 104, 108 can be a locking screw hole having internal threads 112 for threadingly engaging with a thread on a head of a fixation screw as will be described herein. In some embodiments, all fixation apertures 104, 108 have internal threads 112.

The housing 102 is configured to be fixed to a bone at a first location and the rod 106 is configured to be fixed to the bone at a second location. In order to grow or lengthen bone, the bone either has a pre-existing separation or is purposely cut or broken (e.g., via an osteotomy) to create this separation, dividing the bone into a first section and a second section. The cut may be done prior to implanting and securing the device 100 or may be done after the device 100 is implanted, for example by use of a flexible Gigli saw. As will be described herein, the rod 106 is configured to contract (e.g., for compression) and/or distract (e.g., for limb lengthening) relative to the housing 102. The device 100 is configured to allow controlled, precise translation of the rod 106 relative to the housing 102 by non-invasive remote control, and thus controlled, precise translation of the bone segment that is secured to the rod 106 relative to the bone segment that is secured to the housing 102.

Over the treatment period for limb lengthening, the bone is regularly distracted, creating a new separation, into which osteogenesis can occur. Regularly distracted is meant to indicate that distraction occurs on a regular or periodic basis which may be on the order of every day or every few days. An exemplary distraction rate is one millimeter per day, although, other distraction rates may be employed. That is to say, a typical distraction regimen may include a daily increase in the length of the device 100 by about one millimeter. This may be done, for example, by four lengthening periods per day, each having 0.25 mm of lengthening. The device 100, as disclosed in more detail below, has a magnetic drive system, which allows the rod 106 to be telescopically extended from the housing 102, thus forcing the first section and the second section of the bone apart from one another.

Figure 30:
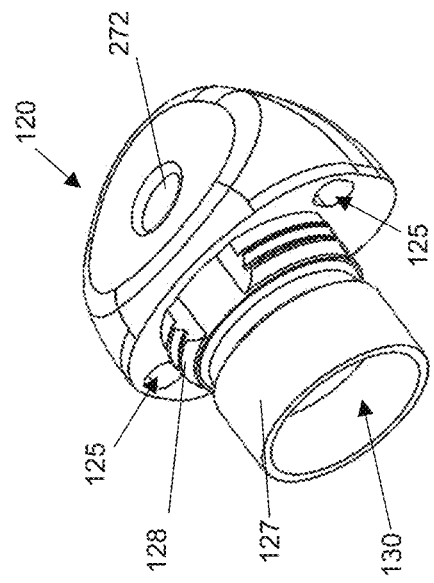
FIG. 30 shows a perspective view of the end cap according to embodiments of the disclosure.
Figure 29:
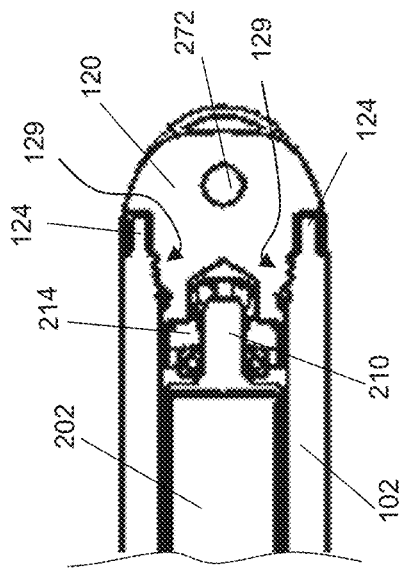
FIG. 29 shows a cross-sectional top view of the device taken along line C-C of FIG. 2 according to an embodiment of the disclosure.

Turning to FIG. 2, at one end, the housing 102 has an opening 118 for receiving the rod 106. One or more o-rings 119 can be positioned about the rod 106 between the rod 106 and the housing 102. In some embodiments, a portion of the outer surface of the rod 106 and/or a portion of an internal surface of the housing 102 can be recessed to accommodate the o-ring(s) 119. The o-ring(s) 119 can help facilitate proper sealing between the housing 102 and the rod 106 so that bodily fluid does not enter the housing 102 when the device 100 is implanted. The housing 102 is sealably closed at the other end by the attachment of an end cap 120. The end cap 120 may be attached to the housing 102 by means of welding, adhesive bonding or other joining techniques. Further, an o-ring 121 may be provided between the end cap 120 and the housing 102 to help provide a seal. As shown in FIG. 29, the housing 102 may include at least one prong 124 configured to be received within an aperture 125 (FIG. 30)

formed within the endcap 120. As shown, the housing 102 can include two prongs 124, each received within an aperture 125 formed within the endcap 120. Further, the endcap 120 can include an extension 127 (FIG. 30) having intermittently spaced male features (barbs, ridges, etc.) 128 (FIG. 30) on an external surface of the extension 127 for mating with complementary female features (e.g., grooves) 129 (FIG. 29) formed within the housing 102 such that when the endcap 120 is attached to the housing 102, the extension 127 extends at least partially within the housing 102 and the intermittently spaced male features 128 are positioned within the complementary female features 129 of the housing 102. Such a coupling between the endcap 120 and the housing 102 results in improved sealing of the housing 102 and ensures the endcap 120 remains in place and does not rotate relative to the housing 102. While it has been shown and described as the extension 127 including male features 127 while the housing 102 includes female features 129, it is to be understood that the reverse configuration is equally contemplated without departing from aspects of the disclosure, such that the extension 127 includes females features while the housing 102 includes complementary male features. In some embodiments, the extension 127 is hollow such that the extension 127 has a cavity 130 therein. The cavity 130 can optionally receive portions of the axle 210 (FIG. 29) and/or maintenance member 214 (FIG. 29) therein.

Figure 4:
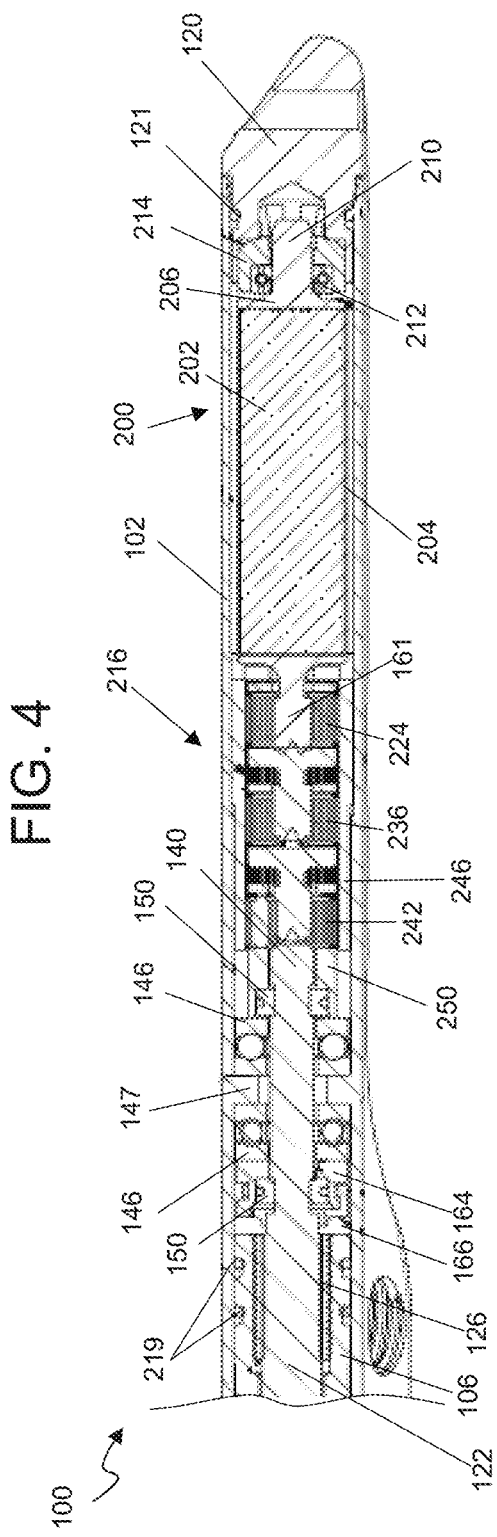
FIG. 4 shows an enlarged view of box 4 of FIG. 2.

Turning to FIGS. 2 and 4, in use, the rod 106 is driven from the housing 102 by means of a lead screw 122 which turns inside a nut 126 that is secured to an inner surface adjacent to a cavity 128 of the rod 106 in which the lead screw 122 is disposed. The nut 126 is positioned between the lead screw 122 and the rod 106. The lead screw 122 is mechanically coupled, in an indirect manner, to a cylindrical permanent magnet 202 contained within the housing 102. As explained in more detail herein, rotation of the cylindrical permanent magnet 202, which is magnetically driven by an external adjustment device 400 (FIG. 21), effectuates rotation of the lead screw 122. Rotation of the lead screw 122 then translates into axial movement of the rod 106 relative to the housing 102.

Figure 3:
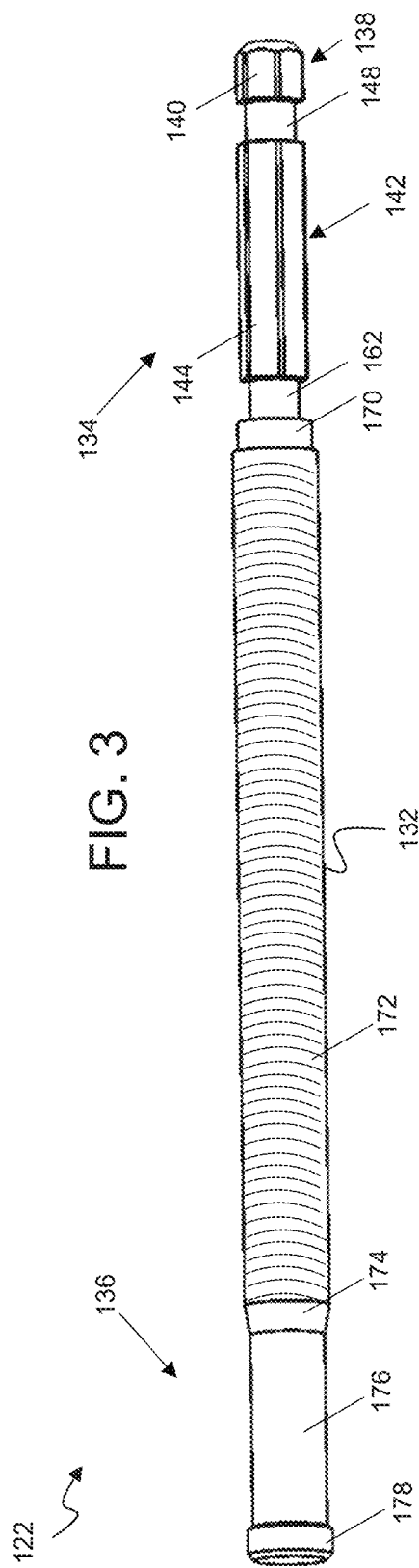
FIG. 3 shows a side view of a lead screw according to embodiments of the disclosure.

As shown in FIG. 3, the lead screw 122 includes a shaft 132 having a first end 134 and a second end 136. The first end 134 of the shaft 132 is configured to be coupled with the magnetic assembly 200 (FIGS. 2 and 4). The first end 134 may include a first end portion 138 having an external keyed surface 140 (e.g., a hex shape) and a second portion 142 having an external keyed surface 144 (e.g., a hex shape). The first end portion 138 is configured to be engaged within an opening 252 (FIG. 7) of the drive stage 250 (FIGS. 4 and 7) of gear assembly 216 (FIGS. 2, 4, and 7) as will be described herein. The second portion 142 having the external keyed surface 144 is configured to be engaged with at least one thrust bearing 146 (two shown in FIG. 4) positioned adjacent to at least one retainer clip 150 (two shown). The thrust bearings 146 each consist of two separate races with ball bearings between the two races. The thrust bearings 146 are configured to transmit high compressive forces during rotation of the lead screw 122 and axial movement of the rod 106 relative thereto. Further, as best seen in FIG. 4, the housing 102 may include an internal projection and/or ledge 147 disposed between the thrust bearings 146. The ledge 147 serves as an abutment surface for the thrust bearings 146.

Returning to FIG. 3, disposed between the two keyed surfaces 138, 142, the lead screw 122 is recessed such that there is a smaller diameter potion 148. The smaller diameter portion 148 is sized and shaped to accommodate and/or engage with a retainer clip 150 (FIGS. 4-5) such that the retainer clip 150 is disposed within the recess defined by the smaller diameter portion 148 between first and second keyed portions 138, 142. FIG. 5 shows an enlarged view of the retainer clip 150. As shown the retainer clip 150 includes or two separate arcuate members 152. Alternatively, the retainer clip 150 may include a single substantially cylindrical member 152. Member(s) 152 include a recess 154 for seating of an o-ring 156 therein. The lead screw 122 is recessed on an opposing side of the second portion 142 such that there is another smaller diameter portion 162. Like portion 148, this portion 162 is also sized and shaped to accommodate and/or engage with a retainer clip 150 such that the retainer clip 150 is disposed within the recess defined by the smaller diameter portion 162. Further, the retainer clips 150 together with the ledge 147 of the housing 102 provide support for the thrust bearings 146 due to the retainer clips 150 being positioned about the lead screw 122 on opposing sides of the thrust bearings 146.

The lead screw 122 also includes a step 170 from the smaller diameter portion 162 to a larger diameter portion 172. This larger diameter portion 172 is at least partially threaded and at least partially surrounded by the nut 126 (FIGS. 2 and 4) to facilitate axial movement of the rod 106 relative to the housing 102. The second end 136 of the lead screw 122 includes a ramp 174 that transitions from the larger diameter portion 172 to an intermediary diameter portion 176. The intermediary diameter portion 176 terminates in a stop 178. The intermediary diameter portion 176 does not contain any threads so as the rod 106 engages this region of the lead screw 122, no additional movement of the rod 106 will be created. The stop 178 prevents the rod 106 from disengaging from the lead screw 122 completely. The stop 178 also prevents the nut 126 (which travels with the rod 106 due to the nut 126 being fixed to the rod 106) from interfering with and/or engaging the anti-rotation tab(s) 262 when in a fully distracted state. The intermediary diameter portion 176 can be of a diameter smaller than the larger diameter portion 172 and larger than the small diameter portions 148, 162. However, it is also contemplated the intermediary diameter portion 176 is of the same dimension as the smaller diameter portions 148, 162 or the larger diameter portions 172.

The device 100 also includes an anti-jam feature configured to prevent the rod 106 from jamming or stalling in a fully retracted state. Specifically, the anti-jam feature provides a spring force to overcome a friction force of the rod 106 in a scenario where the rod 106 jams or stalls. As shown in FIGS. 4 and 6, the anti-jam feature includes a substantially circular anti-jam retainer 164 and a semi-circular anti-jam ring 166 coupled thereto. The anti-jam retainer 164 includes an opening 180 having a keyed shape (e.g., hex shape) to complement the keyed shape 144 of the lead screw 122 at portion 142. This allows the anti-jam retainer 164 to be rotational fixed relative to the lead screw 122, and therefore, as the lead screw 122 rotates, the anti-jam retainer 164 rotates with the lead screw 122. The anti-jam retainer 164 also includes a collar 182 for substantially surrounding the retainer clip 150 and maintaining a position of the retainer clip 150 relative to the lead screw 122. As shown, the internal surface of the collar 182 is substantially circular and does not have a keyed shape like opening 180. The collar 182 includes a groove 184 formed in an outer surface thereof. The collar 182 also includes a tab and/or projection 186 extending radially and axially therefrom. The anti-jam ring 166 is semi-circular in shape and includes a flange 188 configured to be received within the groove 184 of the anti-jam retainer 164. The flange 188 has a width less than a width of the groove 184 such that slight axially movement of the flange 188 within the groove 184 is allowed, which therefore allows slight axially movement of the anti-jam ring 166 relative to the anti-jam retainer 164. The flange 188/ groove 184 configuration maintains the coupling of the anti-jam ring 166 with the anti-jam retainer 164 while allowing the anti-jam ring 166 and the anti-jam retainer 164 to move rotationally and axially relative to each other. In addition, the anti-jam ring 166 includes a tab and/or a projection 190 extending axially and radially therefrom.

Figure 31:
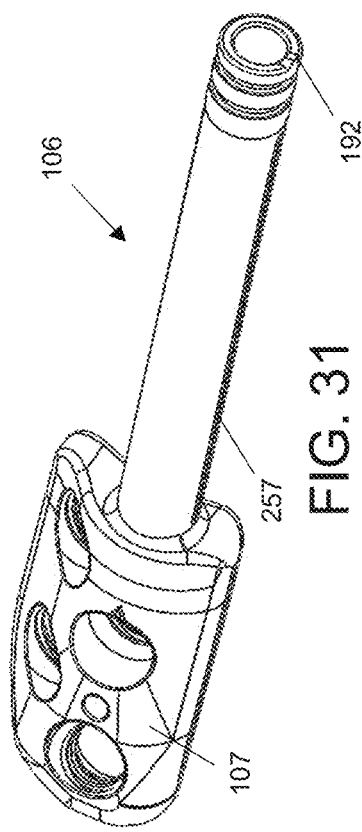
FIG. 31 shows a perspective view of the rod according to embodiments of the disclosure.

Together, the anti-jam retainer 164 and ring 166 prevent the rod 106 from jamming or stalling in a fully retracted state. For example, a rod 106 may become jammed in a fully retracted state due to frictional forces in the retracted state. Therefore, a torque greater than a torque provided by the external adjustment device 400 may be needed to jumpstart or overcome the frictional forces in a jammed state. As a result, the anti-jam feature provides a built-in mechanism within the device 100 to provide an additional force above and beyond that which is provided by the external adjustment device 400 thereby providing such a jumpstart force. Specifically, in a jammed state, the external adjustment device causes the lead screw 122 (via the magnet 202 (FIG. 4)) to rotate but the rod 106 does not move axially due to being jammed. In the jammed state, a tab and/or projection 192 (FIG. 31) on the end of the rod 106 engages with the tab 190 of the anti-jam ring 166. This causes the anti-jam ring 166 to move axially toward the anti-jam retainer 164. As the external adjustment device causes the lead screw 122 to rotate, and with the anti-jam ring 166 positioned toward the anti-jam retainer 164, the tab 186 on the anti-jam retainer 164 contacts the tab 190 on the anti-jam ring 166 to cause the anti-jam ring 166 to spring away from the anti-jam retainer 164 and toward the rod 106 (which is still in contact with the anti-jam ring 166) thereby providing sufficient force to overcome the frictional forces holding the rod 106 in the jammed state. As a result, this causes the rod 106 to become unjammed.

As shown in FIG. 4, a rotatable magnetic assembly 200 is located within the housing 102. The magnetic assembly 200 includes a cylindrical, radially-poled permanent magnet 202 contained within a magnet housing 204 having an end cap 206. The permanent magnet 202 may include rare earth magnet materials, such as Neodymium-Iron-Boron. The permanent magnet 202 has a protective Phenolic coating and may be held statically within the magnet housing 204 and end cap 206 by epoxy or other adhesive. The magnet housing 204, end cap 206 and epoxy form a seal to further protect the permanent magnet 202. The magnet housing 204 may also be welded to end cap 206 to create a hermetic seal. To aid in manufacturing and assembly, the magnet housing 204 may include separate magnet cups 207, 208 (FIG. 7) for housing the permanent magnet 202 therein. The end cap 206 includes cylindrical extension or axle 210 which fits within the inner diameter of a radial bearing 212, allowing for low friction rotation. The outer diameter of radial bearing 212 fits within cavity 213 (FIG. 9) of a maintenance member 214 as seen, for example, in FIG. 4.

An enlarged view of the maintenance member 214 is shown in FIG. 9. The maintenance member 214 prevents the device 100 from being accidentally adjusted by movements of the patient. The maintenance member 214 is positioned proximate and axially spaced from the magnet assembly 200 within the device 100. The maintenance member 214 is made from a magnetically permeable material, such as 400 series stainless steel. The maintenance member 214 can be generally cylindrical in shape having two spaced apart tabs and/or projections 215 separated by gaps. When the device 100 is not being adjusted (e.g., using an external adjustment device), the magnetic poles of the radially-poled cylindrical magnet are magnetically attracted to the tabs 215. However, when the magnetic assembly 200 is forced to rotate due to the effect of a sufficiently large rotating magnetic field on the radially-poled cylindrical magnet 202, the magnetic assembly 200 overcomes the smaller attractions of the tabs 215. The maintenance member 214 also includes flanged extension and/or flanged extension fingers 217 for engaging with the end cap 120 and/or housing 102. Additional details of the maintenance member can be found in U.S. Pat. Pub. 20190015138, filed Jul. 26, 2018, which is incorporated herein by reference as if set forth in its entirety. Other maintenance members such as those disclosed in U.S. Pat. No. 8,734,488 filed Aug. 4, 2011 and U.S. application Ser. No. 13/525,058 filed Jun. 15, 2012, each of which are incorporated herein by reference as if set forth in its entirety.

As shown in FIGS. 2, 4, and 7, the magnetic assembly 200 is coupled to a gear assembly 216. The gear assembly 216 is configured to couple the lead screw 122 to the magnet assembly 200. Referring to FIG. 7, the magnetic assembly 200 terminates at an opposing end in a first sun gear 218 which is integral to magnet housing 204. First sun gear 218 may also be made as a separate component and secured to magnet housing 204, for example by welding. First sun gear 218 turns with rotation of magnetic assembly 200 (in a 1:1 fashion) upon application of a moving magnetic field applied to the patient from an external location. The first sun gear 218 is configured to insert within opening of a first gear stage 224 having three planetary gears 226 which are rotatably held in a frame 228 by axles 232. Second sun gear 234, which is the output of the first gear stage 224, turns with frame 228. The identical components exist in second gear stage 236, which outputs to a third sun gear 238, and third gear stage 242, which terminates in a drive stage 250. The drive stage 250 is positioned about the gear assembly 216 furthest from the magnet assembly 200. Along the length that the gear stages 224, 236, 242 extend, the inner wall 244 of a ring gear 246 (as seen in FIG. 8) has internal teeth 248 along which the externally extending teeth of the planetary gears 226 engage, as they turn. Each gear stage illustrated has a 4:1 gear ratio, so the drive stage 250 turns once for every 64 turns of the magnetic assembly 200.

The frame 228 of the third gear stage 242 includes the drive stage 250. The drive stage 250 includes an opening 252 having a keyed internal surface 254. The keyed internal surface 254 is configured to matingly engage with a keyed external surface 140 of the end 134 of the lead screw 122. The engagement of the keyed surfaces 254, 140 prevent rotation of lead screw 122 and the drive stage 250 relative to each other. The keyed surfaces 254, 140 may be, for example, a hex shape. However, other shapes that prevent rotation of the lead screw 122 relative to the drive stage 250 are also contemplated by the disclosure. To further maintain the lead screw 122 within the drive stage 250, a first retainer clip 150 may be provided within the opening 252 of the drive stage 250 and at least partially surrounding the lead screw 122 proximal to the keyed external surface 140. Specifically, the retainer clip 150 is positioned about the smaller diameter portion 148 (FIG. 3) within the opening 252.

The torque applied on the magnetic assembly 200 by the action of the rotating magnetic field on the cylindrical permanent magnet 202, is therefore augmented on the order of 64 times in terms of the turning torque of the lead screw 122. This allows the rod 106 to be able to move with high precision. Because of the 64:1 gear ratio, the device 100 is able to axially displace the bone segment coupled to the rod 106 against severe resisting forces, for example those created by soft tissue.

The thrust bearing(s) 146 serves to protect the magnet assembly 200 and the gear assembly 216 of the drive from any significant compressive or tensile stresses. When there is a compressive force on the device, for example, when distracting a bone, and thus resisting the tensile strength of the soft tissues, the thrust bearing(s) 146 abuts against retainer clip(s) 150 and/or ledge 147. Additionally, though the device 100 is not as often used for pulling bones together, there may be some applications where this is desired. For example, in certain compressive applications it is the goal to hold two fractured sections of a bone together. Because the bone may have fracture in a non-uniform or shattered pattern, it may be difficult to determine the desired length of the device 100 until after it is implanted and fully attached. In these situations, it can be easy to misjudge the length, and so a gap may exist between the separate sections or fragments of bone. By placing a slightly extended device 100 and securing it, the device 100 may be retracted magnetically, after it has been secured within the bone fragments, so that it applies the desired compression between the two fragments. In these compressive applications, there would be tensile force on the device 100 and the thrust bearing(s) 146 would abut against the retainer clip(s) 150 or ledge 147. In both situations, the thrust bearings 146 and the ledge 147 take the large stresses, not the magnet assembly 200 or gear assembly 216 of the drive system.

Figure 25:
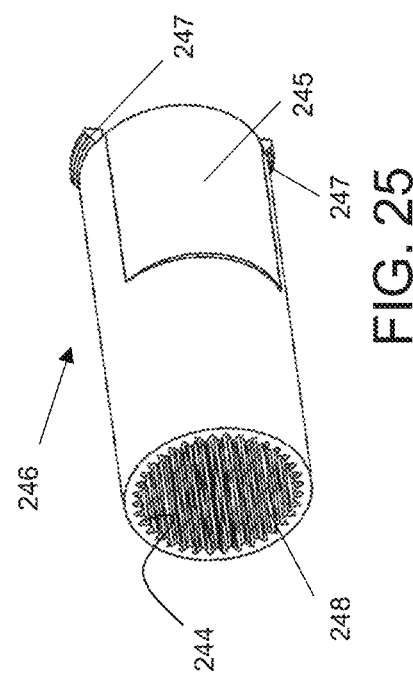
FIG. 25 shows an enlarged perspective view of an alternative embodiment of a ring gear according to embodiments of the disclosure.
Figure 26:
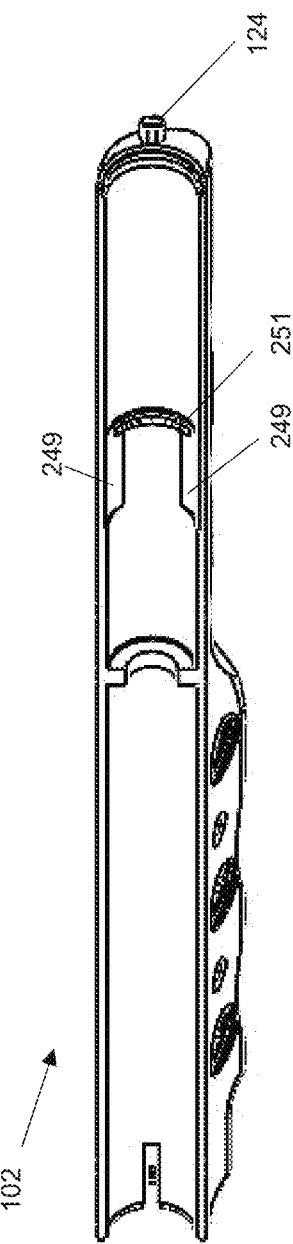
FIG. 26 a cross-sectional perspective view of the housing according to an embodiment of the disclosure.

FIG. 25 shows another embodiment of the ring gear 246. As shown, the ring gear 246 includes the inner wall 244 having internal teeth 248 as well as at least one raised portion 245 and at least one tab and/or projection 247. The raised portion 245 is positioned on an external surface of the ring gear 246 such that the raised portion 245 extends radially from the external surface of the ring gear 246. In some embodiments, the ring gear 245 can include two raised portions 245 positioned on opposing sides of the ring gear 245. The raised portion 245 engages with and/or mates with a complementary cutout or depression 249 (FIG. 26) formed within the housing 102 on an internal surface thereof, at a location where the housing 102 surrounds the ring gear 246. Where two opposing raised portions 245 are included on the ring gear 246, the housing 102 can include two opposing complementary cutouts or depressions 249. It is to be understood that any number of raised portions 245 and complementary cutouts 249 can be included without departing from aspects of the disclosure. Further, it is contemplated that an alternative configuration is equally applicable, as the housing 102 can include one or more raised portions that engage with and/or mate with complementary cutouts or depressions on the ring gear 246.

The tab 247 of the ring gear 246 can be positioned about an end of the ring gear 246 and extend radially therefrom. The tab 247 engages with and/or mates with a complementary groove 251 formed within the housing 102 on an internal surface thereof, where the housing 102 surrounds the ring gear 246. It is to be understood that any number of tabs and/or projections 247 and complementary grooves 251 can be included without departing from aspects of the disclosure. For example, the ring gear 246 can include two tabs 247 on opposing sides of the ring gear 246. As shown, in some embodiments, each tab 247 may be positioned between the raised portions 245 such that tabs and raised portions 245 alternate about the ring gear 246. Further, it is contemplated that an alternative configuration is equally applicable, as the housing 102 can include tabs and/or projections that engage with and/or mate with complementary grooves on the ring gear 246. These complementary features on the ring gear 246 and housing 102 prevent the ring gear 246 from moving axially relative to the housing 102.

Figure 28:
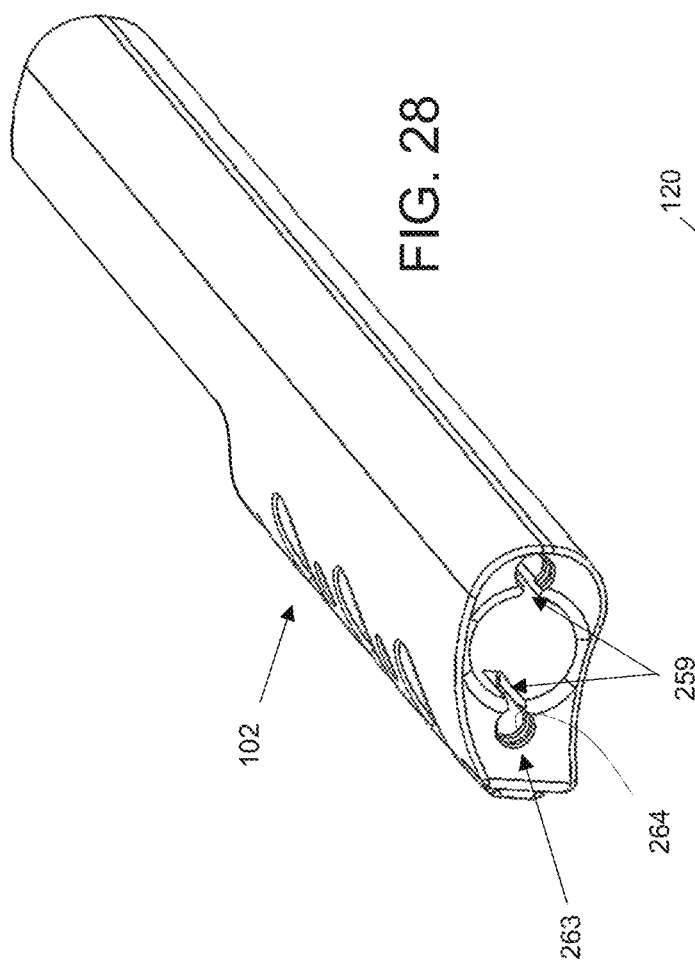
FIG. 28 shows a perspective view of the housing according to an embodiment of the disclosure.
Figure 27:
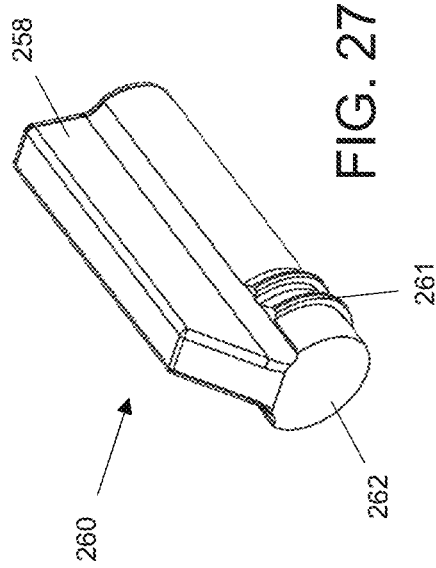
FIG. 27 shows a perspective view of the anti-rotation feature according to an embodiment of the disclosure.

Turning now to FIGS. 10, 11, and 27, the device 100 can include at least one anti-rotation feature 260 positioned about the rod 106. As shown in FIG. 10, the anti-rotation feature 260 can include a pin and/or tab 262 and an extension 258. The extension 258 can be integrally formed with the tab 262 or fixed thereto. The tab 262 includes a male feature (barbs, ridges, etc.) 261 disposed thereon. The tab 262 is configured to be positioned within a cutout 263 (FIGS. 11 and 28) disposed within an internal surface of the housing 102. The extension 258 is configured to be positioned within a slot and/or groove 257 (FIGS. 11 and 31) within the rod 106 and a slot and/or groove 259 (FIGS. 11 and 28) formed within the housing 102 proximate to the cutout 263 such that the extension 258 of the anti-rotation feature 260 extends from the tab 262 within slot and/or groove 259, 257. Such a configuration of the anti-rotation feature 260 prevents rotation of the rod 106 relative to the housing 102 and guides the rod 106 as the rod 106 translates axially relative to the housing 102. In some embodiments (as shown), the device 100 can include two anti-rotation features 260 disposed on opposing sides of the rod 106. In other embodiments, the device 100 can include one anti-rotation feature 260 positioned on one side of the rod 106. The male feature 261 (FIGS. 10 and 27) is positioned on at least an external portion of the tab 262 and engages and/or mates with a complementary female feature (e.g., grooves) 264 (FIG. 28) on an internal surface of the housing 102. More specifically, the female feature 264 is formed within the cutouts 263 of the housing 102 such that the male features 261 are positioned within the female features 264 when the tab 262 is positioned within the cutout 263. Alternatively, the opposite configuration is equally contemplated such that the tab(s) 262 can include a female feature while an internal surface of the housing 102 includes a complementary male feature. When the rod 106 is in the fully distracted state, the anti-rotation feature 260 remains positioned within the housing 102.

Figure 17:
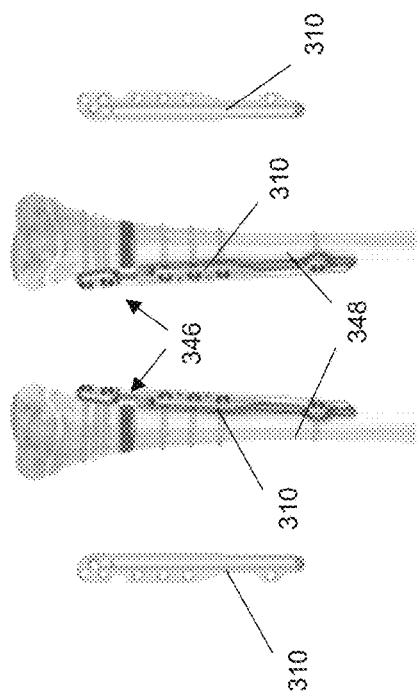
FIG. 17 shows various embodiments of an extramedullary distraction and compression device according to the disclosure that can be attached to a distal end of a femur bone.

Returning now to FIG. 1, the device 100 can include pin holes 272 for receiving pins to help aid in holding the device 100 against the bone during implantation of the device 100 as is known in the art. As shown, the pin holes 272 can be positioned at various positions about the rod 106, the housing 102, and/or the endcap 120. Further, the device 100 can include any number of fixation apertures 104, 108 positioned within the housing 102, the rod 106 and/or the endcap 120 without departing from aspects of the disclosure. In some embodiments, the device 100 of FIG. 1 can be affixed to a proximal portion of the bone, e.g., a proximal end of a femur (FIG. 15), or to a distal portion of the bone, e.g., a distal end of a femur (FIG. 17). Further, the device 100 can be positioned antegrade or retrograde.

FIGS. 12-14 show extramedullary distraction and compression devices according to other embodiments of the disclosure. Specifically, the devices 310, 320, 330 of FIGS. 12-14 differ from device 100 (FIG. 1) in their outer configuration or dimension. Further, it is to be understood that the overall lengths of the rod 106 and/or housing 104 can be adjusted depending on the particular application and/or bone that the device 100, 310, 320, 330 is being affixed to. The internal components of the devices 310, 320, 330 are the same as device 100 and duplicative description of which has been omitted for brevity. The differing outer configurations or dimensions may be determined by the location on the bone which the device 100, 310, 320, 330 is to be implanted and the size or length of the bone.

Figure 18:
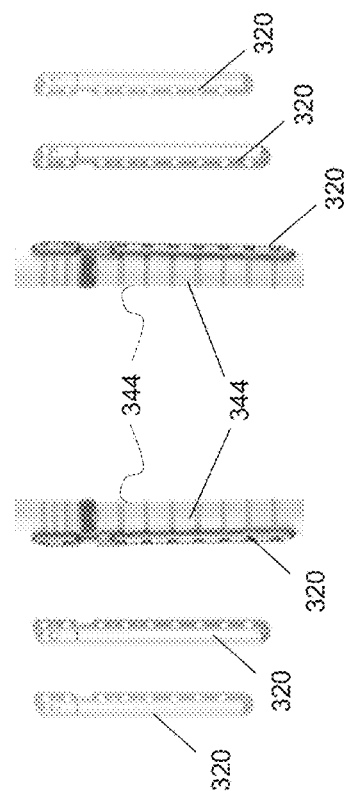
FIG. 18 shows various embodiments of an extramedullary distraction and compression device according to embodiments of the disclosure that can be attached to a proximal end of the posterior-medial tibia bone.

For example, device 310 of FIG. 12 has substantially the same outer configuration as device 100 (FIG. 1), however, the device 310 includes a second bulge 312 spaced from the bulge 209 (at an end of the device 310 opposite the plate 107) that includes an additional fixation aperture 314. Like device 100, this device 310 can also be affixed to a proximal portion of the bone, e.g., a proximal end 342, 346 of a femur 344 (FIG. 15) or tibia 348 (FIG. 18), or to a distal portion of the bone, e.g., a distal end 349 of a femur (FIG. 17).

Figure 16:
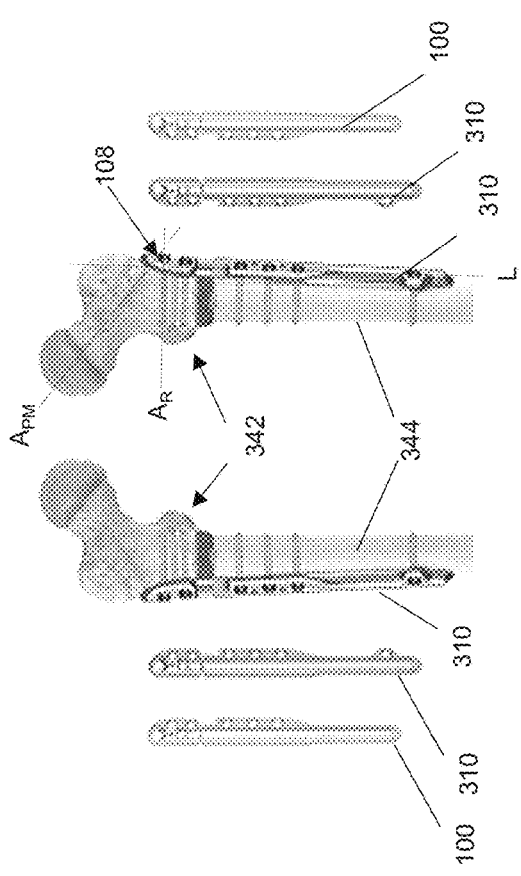
FIG. 16 shows various embodiments of an extramedullary distraction and compression device according to the disclosure that can be attached to a shaft of a femur bone.

The device 320 according to FIG. 13 is substantially the same as device 100 (FIG. 1), however, the bulge 109 of device 320 extends a substantial length of the housing 102. Further, the device 320 may include fixation apertures 104 extending along a substantially length of the housing 102 about the bulge 109. This embodiment of the device 310 may be used about the shaft of the bone, e.g., the shaft 352 of a femur 344 as shown in FIG. 16. Further, this device 320 can include a different number of fixation apertures 108 within the bulge 107 of the rod 106.

The device 330 according to FIG. 14 is substantially the same as device 100 (FIG. 1), however, the plate 107 of this device can be substantially curved and configured to be affixed to the proximal end 346 of a tibia 348 at a posterior-medial location on the tibia 348. For example, the plate 107 of the device 330 can include a first fixation aperture 332 configured to be affixed at a medial portion of the tibia 348 and at least one other fixation aperture 334 configured to be affixed at a posterior portion of the tibia 348.

Figure 15:
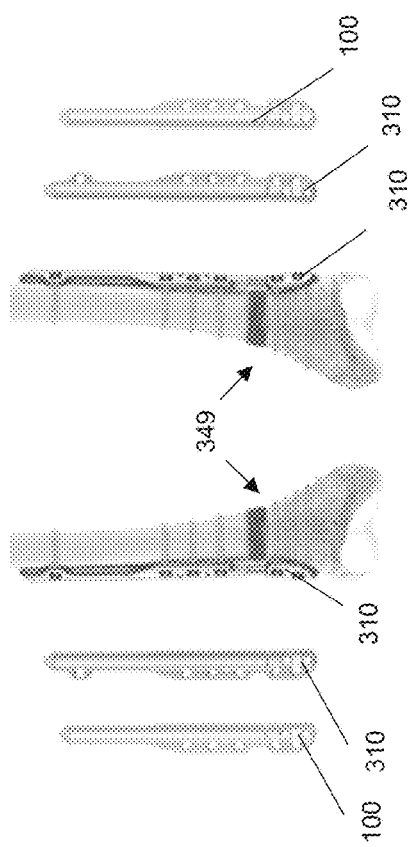
FIG. 15 shows various embodiments of an extramedullary distraction and compression device according to the disclosure that can be attached to a proximal end of a femur bone.

FIG. 15 shows examples of the device 100, 310 that can be used at the proximal portion 342 of the femur 344. As shown, the proximal-most fixation aperture 108 is angled relative to the longitudinal axis L for the device 100 so that a screw positioned therein is angled APM and extending toward the head of the femur 344. In some embodiments, the proximal-most fixation aperture 108 is angled at an angle APM of approximately 115° to approximately 125° relative to the longitudinal axis L of the device 100 while the screws positioned within the remainder of the fixation apertures 108 extend at an angle AR of approximately 90° relative to the longitudinal axis L of the device 100.

Turning now to FIGS. 19 and 20, examples of screws that can be used to affix the devices 100, 310, 320, 330 to bone are shown. FIG. 19 shows a non-locking screw 410. As shown, the non-locking screw 410 includes a threaded shaft 412 and a screw head 414. The screw head 414 is not threaded and substantially rounded in shape. The screw head 414 can include a recess 415 for engaging with a tool, e.g., a driver. FIG. 20 shows a locking screw 420. As shown, the locking screw 420 includes a threaded shaft 412 and a threaded screw head 416. The threaded screw head 416 can include a recess 415 for engaging with a tool, e.g., a driver. The threaded screw head 416 is configured to threadingly engage with the internal thread 212 (FIG. 2) of a fixation aperture 104, 108 to lock an angular orientation of the locking screw 420 relative to the housing 102 and/or the rod 106. It is to be understood that combinations of locking and/or non-locking screws 410, 420 can be used to affix the device 100, 310, 320, 330 to the bone without departing from aspects of the disclosure. Further, it is the be understood that combinations of threaded and non-threaded fixation apertures 104, 108 can be used within the housing 102 and/or the rod 106.

Figure 21:
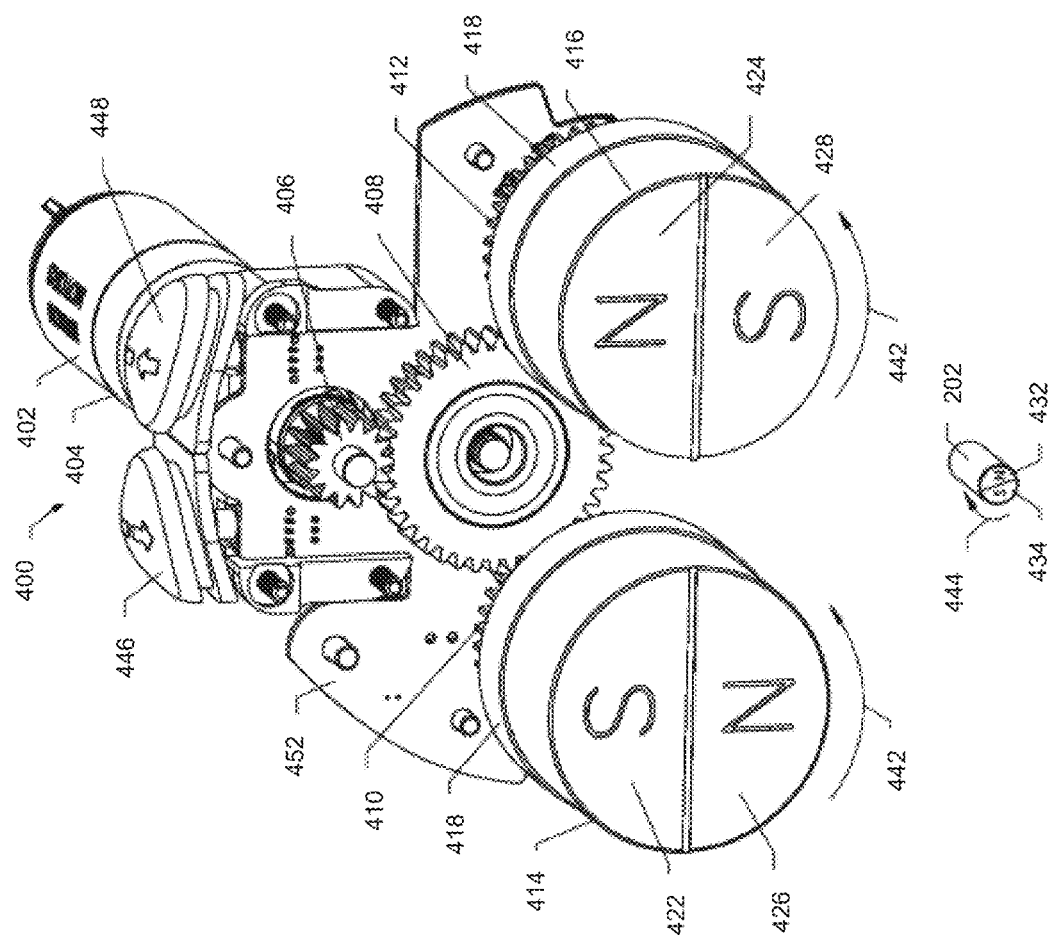
FIG. 21 shows internal components of an external adjustment device for non-invasively adjusting an extramedullary distraction and compression device according to embodiments of the disclosure.
Figure 22:
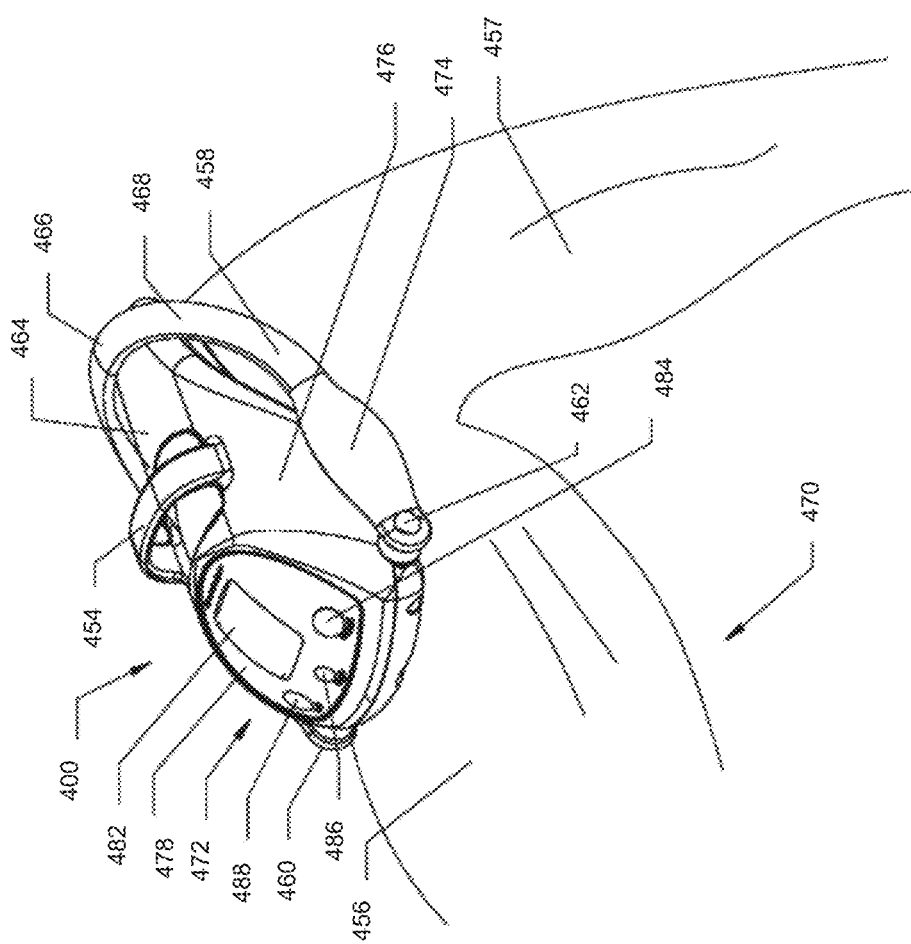
FIG. 22 shows an external adjustment device in a configuration for adjusting an extramedullary distraction and compression device according to embodiments of the disclosure implanted within the femur.
Figure 23:
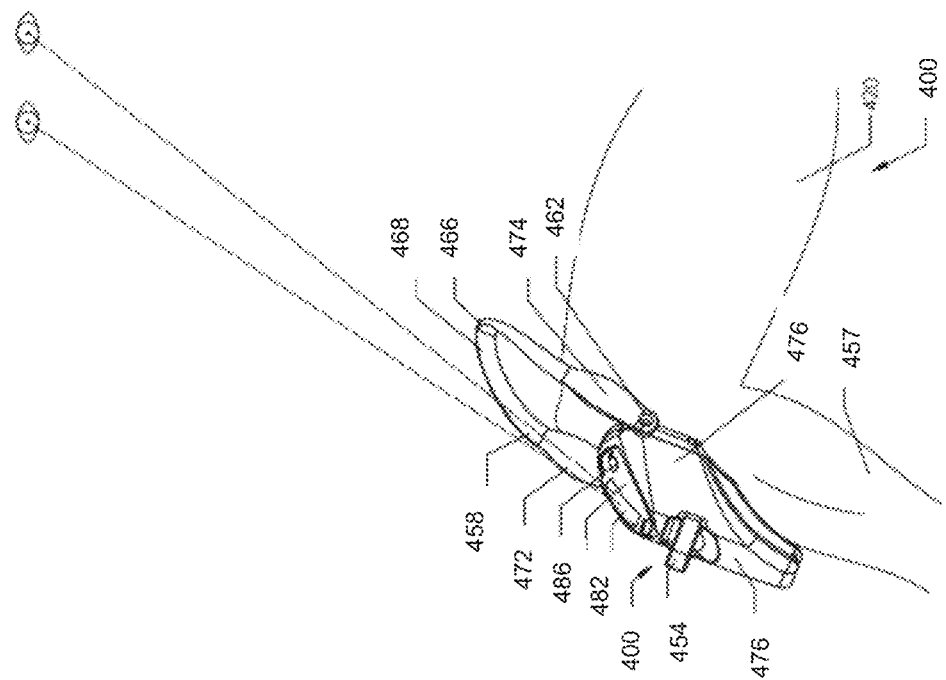
FIG. 23 shows an external adjustment device according to embodiments of the disclosure in a configuration for adjusting an extramedullary distraction and compression device implanted within the tibia.

FIGS. 21-23 illustrate an external adjustment device 400 configured for applying a moving magnetic field to allow for non-invasive adjustment of the device 100, 310, 320, 330 by turning a permanent magnet 202 within the device 100, 310, 320, 330, as described. FIG. 21 illustrates the internal components of the external adjustment device 400, and for clear reference, shows the permanent magnet 202 of the device 100, 310, 320, 330, without the rest of the assembly. The internal working components of the external adjustment device 400 may, in certain embodiments, be similar to that described in U.S. Patent Application Publication No. 2012/0004494, which is incorporated by reference herein. A motor 402 with a gear box 404 outputs to a motor gear 406. Motor gear 406 engages and turns central (idler) gear 408, which has the appropriate number of teeth to turn first and second magnet gears 410, 412 at identical rotational speeds. First and second magnets 414, 416 turn in unison with first and second magnet gears 410, 412, respectively. Each magnet 414, 416 is held within a respective magnet cup 418 (shown partially). An exemplary rotational speed is 60 RPM or less. This speed range may be desired in order to limit the amount of current density induced in the body tissue and fluids, to meet international guidelines or standards. As seen in FIG. 21, the south pole 422 of the first magnet 414 is oriented the same as the north pole 424 of the second magnet 416, and likewise, the first magnet 414 has its north pole 426 oriented the same as the south pole 428 of the second magnet 416. As these two magnets 414, 416 turn synchronously together, they apply a complementary and additive moving magnetic field to the radially-poled, permanent magnet 202, having a north pole 432 and a south pole 434. Magnets having multiple north poles (for example, two) and multiple south poles (for example, two) are also contemplated in each of the devices. As the two magnets 414, 416 turn in a first rotational direction 442 (e.g., counter-clockwise), the magnetic coupling causes the permanent magnet 202 to turn in a second, opposite rotational direction 444 (e.g., clockwise). The rotational direction of the motor 302 and corresponding rotational direction of the magnets 414, 416 is controlled by buttons 446, 448. One or more circuit boards 452 contain control circuitry for both sensing rotation of the magnets 414, 416 and controlling the rotation of the magnets 414, 416.

FIGS. 22 and 23 show the external adjustment device 400 for use with a device 100, 310, 320, 330 placed in the femur (FIG. 22) or the tibia (FIG. 23). The external adjustment device 400 has a first handle 454 for carrying or for steadying the external adjustment device 400, for example, steadying it against an upper leg 456 (as in FIG. 22) or lower leg 457 as in (FIG. 23). An adjustable handle 458 is rotationally attached to the external adjustment device 400 at pivot points 460, 462. Pivot points 460, 462 have easily lockable/unlockable mechanisms, such as a spring-loaded brake, ratchet or tightening screw, so that a desired angulation of the adjustable handle 458 in relation to housing 464 can be adjusted and locked in orientation. Adjustable handle 458 is shown in two different positions in FIGS. 22 and 23. In FIG. 22, adjustable handle 458 is set so that apex 466 of loop 468 rests against housing 464. In this position, patient 470 is able to hold onto one or both of grips 472, 474 while the adjustment procedure (for example transporting bone between 0.10 mm to 1.50 mm) is taking place. It is contemplated that the procedure could also be a lengthening procedure for a bone lengthening device or a lengthening procedure for a lengthening plate which is attached external to the bone. Turning to FIG. 23, when the bone transport device 100, 310, 320, 330 is implanted in a tibia, the adjustable handle 458 may be changed to a position in which the patient 470 can grip onto the apex 466 so that the magnet area 476 of the external adjustment device 400 is held over the portion of the device 100, 310, 320, 330 containing the permanent magnet 202. In both cases, the patient 470 is able to clearly view control panel 478 including a display 482. In a different configuration from the two directional buttons 414, 416 in FIG. 21, the control panel 478 includes a start button 484, a stop button 486 and a mode button 488. Control circuitry contained on circuit boards 452 may be used by the surgeon to store important information related to the specific aspects of each particular patient. For example, in some patients an implant may be placed antegrade into the tibia. In other patients the implant may be placed either antegrade or retrograde about the femur. In each of these three cases, it may be desired to move the bone either from distal to proximal or from proximal to distal. By having the ability to store information of this sort that is specific to each particular patient within the external adjustment device 400, the external adjustment device 400 can be configured to direct the magnets 414, 416 to turn in the correct direction automatically, while the patient need only place the external adjustment device 400 at the desired position, and push the start button 484. The information of the maximum allowable bone transport length per day and maximum allowable bone transport length per session can also be input and stored by the surgeon for safety purposes. These may also be added via an SD card or USB device, or by wireless input. An additional feature is a camera at the portion of the external adjustment device 400 that is placed over the skin. For example, the camera may be located between first magnet 414 and second magnet 416. The skin directly over the implanted permanent magnet 202 may be marked with indelible ink. A live image from the camera is then displayed on the display 482 of the control panel 478, allowing the user to place the first and second magnets 414, 416 directly over the area marked on the skin. Crosshairs can be overlaid on the display 482 over the live image, allowing the user to align the mark on the skin between the crosshairs, and thus optimally place the external adjustment device 400.

Other external adjustment devices can be used to cause actuation of the distraction devices described herein. Such external adjustment devices include, for example, those described in U.S. Pat. No. 8,382,756 filed on Nov. 20, 2009, U.S. Pat. No. 9,248,043 filed Jun. 29, 2011, U.S. Pat. No. 9,078,711 filed on Jun. 6, 2012, U.S. Pat. No. 9,044,281 filed on Oct. 18, 2012, U.S. application Ser. No. 14/698,665 filed on Apr. 28, 2015, U.S. application Ser. No. 14/932,904 filed on Nov. 4, 2015, U.S. Ser. No. 16/004,099 filed on Dec. 12, 2016, and App. No. PCT/US2020/017338 filed on Feb. 7, 2020, all of which are incorporated herein by reference as if set forth in their entirety.

Turning now to FIG. 24, aspects of the disclosure are also directed to a method for lengthening a limb. The method can include providing an extramedullary distraction and compression device 310. FIG. 24 shows device 310 being affixed to a proximal end of a femur 344. However, the method is equally applicable to the other devices 100, 320, 330 disclosed herein about other sites of the femur 344 of tibia 348 as was disused relative to FIGS. 15-18. As discussed herein, the distraction device 310 can have a housing 102 including a first screw hole 104 and a rod 106 including a second screw hole 108 wherein the rod 106 is configured to distract or contract relative to the housing 102. The method also includes attaching the housing 102 to a bone within the limb, e.g., femur 344, at a first location 502 by inserting at least one screw, e.g., a locking screw 420 (FIG. 20), within at least one screw hole 104 and attaching the rod 106 to the bone at a second location 504 by inserting at least one screw, e.g., a locking screw 420, within at least one screw hole 108. As shown and described herein, the distraction device 310 can have any number of screw holes such that more than one screw can be used to affix the device 310 to the bone. Further, it is to be understood that combinations of locking screws and non-locking screws can be used to affix the device 310 to the bone. Where locking screws are used to affix the device 100 to bone, it may be desirable to affix the device 100 so that the device does not bottom-out directly onto the bone so that there is some space between the bone and portions of the device 100. This allows compensation for lateral movement between the two bone sections as the two bone sections move relative to one another. Prior to affixing the device 310 to the bone, the method can include creating an osteotomy 506 between the first and second locations 502, 504.

Further, once the device 310 is affixed to the bone, an external adjustment device 400 can be used to actuate the distraction device 310 to cause the rod 106 to move relative to the housing 102, thereby causing the first bone location 502 to move relative to the second bone location 504. Specifically, the generation of a magnetic field from at least one magnet of the external adjustment device 400 causes rotation of the magnetic assembly 200 within the device 310 which in turn causes the lead screw 122 to rotate. As the lead screw 122 rotates, the lead screw 122 interacts with the nut 126 causing the rod 106 to translate. The translation of the rod 106 causes distraction of the bone attached thereto and in turn causes growth of new bone 508 (or osteogenesis) about the osteotomy site 506. During the actuating, an angular orientation of the locking screw(s) 420 relative to the housing 102 is/are maintained and an angular orientation of the locking screw(s) 420 relative to the rod 106 is/are maintained due to the threaded screw head 416 (FIG. 20) engaging with threads 112 (FIG. 1) of the screw holes 104, 108.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The terminology used herein is for the purpose of describing particular embodiments only and is not intended to be limiting of the disclosure. As used herein, the terms "first," "second," and the like, do not denote any order, quantity, or importance, but rather are used to distinguish one element from another, and the terms "a" and "an" herein do not denote a limitation of quantity, but rather denote the presence of at least one of the referenced item. It will be further understood that the terms "comprises" and/or comprising," when used in this specification, specify the presence of stated features, integers, steps, operations, elements, and/or components, but do not preclude the presence or addition of one or more other features, integers, steps, operations, elements, components, and/or groups. As used herein, "substantially" refers to largely, for the most part, entirely specified or any slight deviation which provides the same technical benefits of the disclosure.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed is:

1. An extramedullary distraction and compression system comprising:
   a housing configured to be attached to a bone at a first location, the housing having a magnet positioned therein;
   a rod configured to be attached to the bone at a second location and comprising a lead screw therein, wherein the lead screw comprises a keyed outer surface at an end proximate the magnet and is coupled to the magnet such that rotation of the magnet causes rotation of the lead screw, and the rod is configured to interact with the lead screw such that, upon rotation of the lead screw, the rod distracts or contracts relative to the housing; and
   at least one retainer clip disposed around the lead screw, wherein a portion of the lead screw proximate the end with the keyed outer surface includes at least one recess and the at least one retainer clip is disposed within the at least one recess of the lead screw.

2. The system of claim 1, wherein at least one of the housing and the rod include at least one locking screw hole.

3. The system of claim 2, comprising at least one locking screw that includes a threaded head and a threaded shaft.

4. The system of claim 3, wherein the threaded head of the at least one locking screw threadingly engages with an internal thread of the at least one locking screw hole to lock an angular orientation of the at least one locking screw relative to the at least one of the housing and the rod.

5. The system of claim 1, further comprising:
   a gear assembly coupling the lead screw to the magnet, wherein a drive stage furthest the magnet includes a keyed internal surface for matingly engaging with the keyed outer surface of the end of the lead screw.

6. The system of claim 1, wherein the at least one retainer clip includes a first retainer clip and a second retainer clip and the at least one recess includes a first recess and a second recess,
   wherein the first retainer clip is disposed within the first recess of the lead screw and the second retainer clip is disposed within the second recess of the lead screw.

7. The system of claim 6, wherein the first and second retainer clips are positioned about the lead screw on opposing sides of a pair of thrust bearings.

8. The system of claim 1, wherein the at least one retainer clip includes an o-ring disposed therein.

9. The system of claim 1, further comprising:
   a pair of thrust bearings disposed about a shaft of the lead screw,
   wherein the housing includes an internal projection disposed between the pair of thrust bearings.

10. The system of claim 1, further comprising:
    a maintenance member positioned proximate the magnet, the maintenance member maintaining a position of the magnet when the distraction system is not being actuated.

11. The system of claim 1, further comprising:
    at least one anti-rotation feature positioned about the rod to prevent the rod from rotating relative to the housing.

12. The system of claim 1, further comprising:
    a nut disposed between the lead screw and the rod.

13. The system of claim 1, further comprising:
    an external remote control for non-invasively actuating the rod.

14. The system of claim 13, wherein the external remote control includes a first magnet configured for rotation about a first axis and a second magnet configured for rotation about a second axis wherein rotation of the first and second magnet cause rotation of the magnet within the housing.

* * * * *